(12) United States Patent
Tseng

(10) Patent No.: US 10,664,167 B2
(45) Date of Patent: May 26, 2020

(54) DATA TRANSMITTING METHOD, MEMORY STORAGE DEVICE AND MEMORY CONTROL CIRCUIT UNIT

(71) Applicant: PHISON ELECTRONICS CORP., Miaoli (TW)

(72) Inventor: Ming-Hui Tseng, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 293 days.

(21) Appl. No.: 15/452,737

(22) Filed: Mar. 8, 2017

(65) Prior Publication Data

US 2018/0203605 A1 Jul. 19, 2018

(30) Foreign Application Priority Data

Jan. 17, 2017 (TW) .............................. 106101491 A

(51) Int. Cl.
*G06F 3/00* (2006.01)
*G06F 3/06* (2006.01)

(52) U.S. Cl.
CPC ............ *G06F 3/061* (2013.01); *G06F 3/0656* (2013.01); *G06F 3/0659* (2013.01); *G06F 3/0679* (2013.01)

(58) Field of Classification Search
None
See application file for complete search history.

(56) References Cited

U.S. PATENT DOCUMENTS

2012/0221767 A1* 8/2012 Post .................... G06F 13/1673
711/103

FOREIGN PATENT DOCUMENTS

| CN | 104008072 | 8/2014 |
| CN | 105740178 | 7/2016 |
| TW | 201306034 | 2/2013 |
| TW | 201432709 | 8/2014 |
| TW | 201502976 | 1/2015 |

OTHER PUBLICATIONS

"Office Action of China Counterpart Application," dated May 24, 2019, p. 1-p. 8.

* cited by examiner

*Primary Examiner* — Midys Rojas
(74) *Attorney, Agent, or Firm* — JCIPRNET

(57) ABSTRACT

A data transmitting method, a memory storage device and a memory control circuit unit are provided. The method is used for a data transmitting operation between the memory storage device and a host system. The host system is recorded with a plurality of submission queues, and the method includes: obtaining at least one first command in a first submission queue from the host system and determining whether a first data quantity of the at least one first command matches a first predetermined condition; obtaining at least one second command in a second submission queue from the host system if the first data quantity matches the first predetermined condition; and sequentially performing a data accessing operation corresponding to the at least one first command and the at least one second command on a rewritable non-volatile memory module in the memory storage device.

27 Claims, 9 Drawing Sheets

DATA TRANSMITTING METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 106101491, filed on Jan. 17, 2017. The entirety of the above-mentioned patent application is hereby incorporated by reference herein and made a part of this specification.

BACKGROUND

Technical Field

The present invention relates to a data transmission mechanism, and more particularly, relates to a data transmitting method, a memory storage device and a memory control circuit unit.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

In order to cope with higher write/read speed of a memory storage device using a rewritable non-volatile memory storage device (e.g., a solid state drive), many data transfer interfaces (e.g., Peripheral Component Interconnect Express; PCIe interface) start to support data transfer protocols of higher level (e.g., a Non-Volatile Memory express (NVMe) interface standard) to take advantage of operating efficiency of the rewritable non-volatile memory storage device in high speed.

In the NVMe interface standard, a memory management circuit of the memory storage device actively sequentially reads from a host system for commands in each submission queue recorded by the host system, and temporarily stores the commands into a command queue in the memory storage device according to a reading precedence. Then, the memory management circuit can perform data accessing on the rewritable non-volatile memory module according to the commands in the command queue. However, if a large number of commands corresponding to the operation performed by the user is recorded in one submission queue, the space of the command queue in the memory storage device will soon be completely consumed by the commands in the submission queue. In this case, if another operation is received by the host system from the user, the memory storage device will not have enough space for storing commands corresponding to said another operation, and the commands corresponding to said another operation can be executed only after all the large number of commands temporarily stored in the command queue are processed.

Thus, the existing data transmission mechanism is unable to provide on an immediate performance for executing commands corresponding to different operations. In particular, even if said another operation of the user only requires accessing a small amount of data, the user still needs to wait a long period of time for the system to respond. As a result, the user will experience a poor operating experience.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data transmitting method, a memory storage device and a memory control circuit unit, which are capable of providing the immediate performance for executing commands corresponding to different operations to improve the operating experience for the user.

An exemplary embodiment of the invention proposes a data transmitting method for a data transmitting operation between a memory storage device and a host system. The host system is recorded with a plurality of submission queues. The data transmitting method includes: obtaining at least one first command in a first submission queue from the host system and determining whether a first data quantity of the at least one first command matches a first predetermined condition; obtaining at least one second command in a second submission queue from the host system if the first data quantity matches the first predetermined condition; and sequentially performing a data accessing operation corresponding to the at least one first command and the at least one second command on a rewritable non-volatile memory module in the memory storage device.

Another exemplary embodiment of the invention provides a memory storage device, which includes a connection interface unit, a rewritable non-volatile memory module and a memory control circuit unit. The connection interface unit is configured to couple to a host system, and the host system is recorded with a plurality of submission queues. The memory control circuit unit is coupled to the connection interface unit and the rewritable non-volatile memory module. The memory control circuit unit is configured to obtain at least one first command in a first submission queue from the host system and determine whether a first data quantity of the at least one first command matches a first predetermined condition. The memory control circuit unit is further configured to obtain at least one second command in a second submission queue from the host system if the first data quantity matches the first predetermined condition. The memory control circuit unit is further configured to send a first access command sequence which instructs to sequentially perform a data accessing operation corresponding to the at least one first command and the at least one second command on the rewritable non-volatile memory module.

Another exemplary embodiment of the invention provides a memory control circuit unit, which is configured to control a rewritable non-volatile memory module. The memory control circuit unit includes a host interface, a memory interface and a memory management circuit. The host interface is configured to couple to a host system, and the host system is recorded with a plurality of submission queues. The memory interface is configured to couple to the rewritable non-volatile memory module. The memory management circuit is coupled to the host interface and the memory interface and includes a plurality of monitor circuits. Each of the monitor circuits corresponds to at least one submission queue of the submission queues. The memory management circuit is configured to obtain at least one first command in a first submission queue from the host system and determine whether a first data quantity of the at least one first command matches a first predetermined condition. The memory management circuit is further configured to obtain at least one second command in a second submission queue from the host system if the first data quantity matches the first predetermined condition. The memory management circuit is further configured to send a first access command sequence which instructs to perform a data accessing operation corresponding to the at least one first command and the at least one second command on the rewritable non-volatile memory module.

Based on the above, in the foregoing exemplary embodiments, the commands matching the predetermined conditions are obtained from each submission queue by the memory management circuit according to the predetermined data quantity corresponding to each submission queue so as to sequentially cache commands with the specific data quantity in each submission queue into the memory storage device. As a result, the immediate performance for executing commands corresponding to different operations can be improved.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
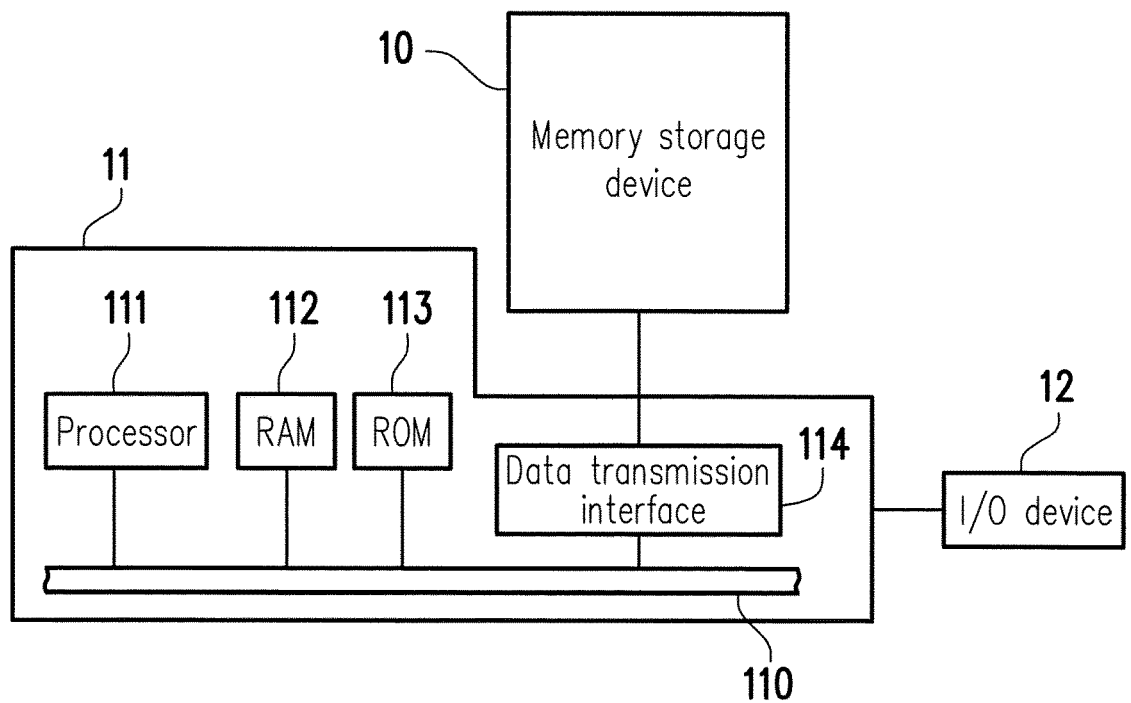
FIG. 1 is a schematic diagram illustrating a host system, a memory storage device and an I/O (input/output) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, the memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
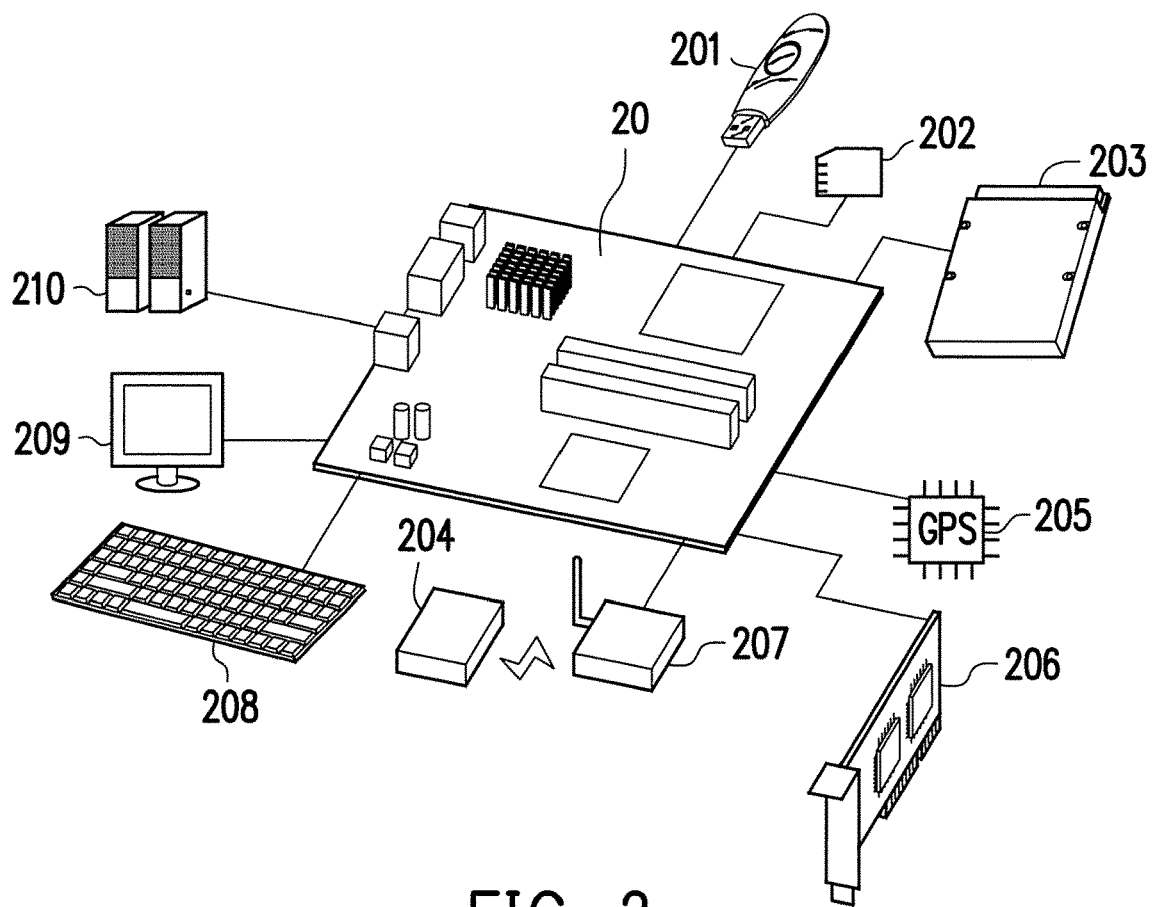
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 can store data into the memory storage device 10 or read data from the memory storage device 10 through the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
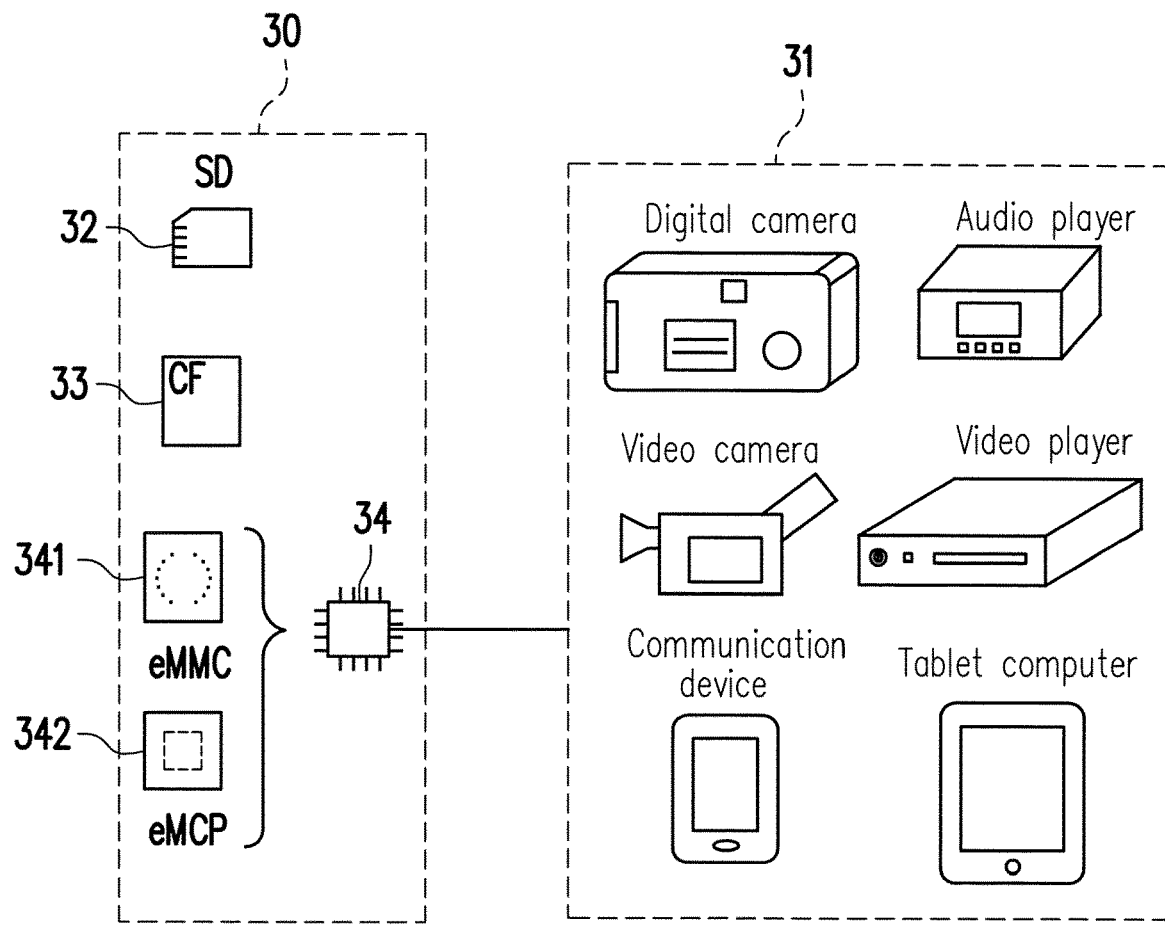
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the invention. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 731, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
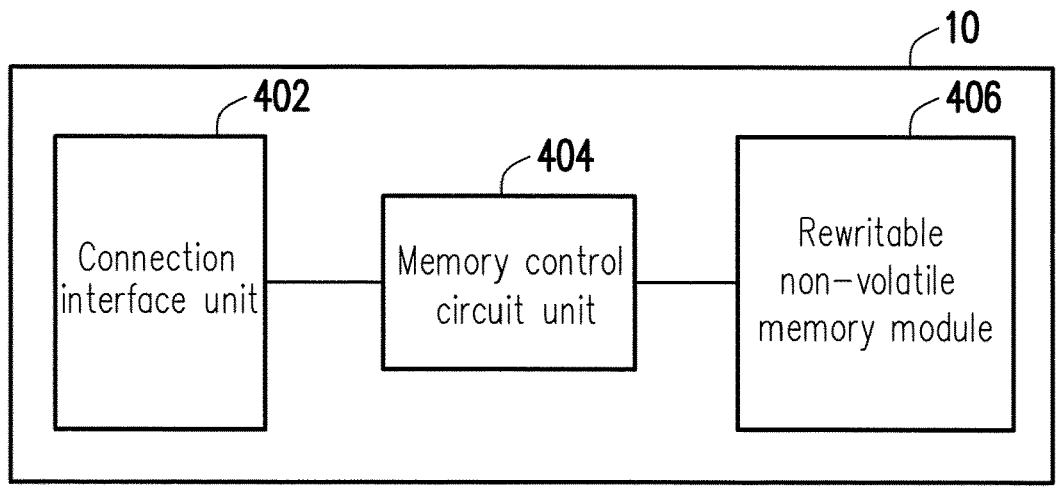
FIG. 4 is a schematic block diagram illustrating a memory storage device according to an exemplary embodiment of the invention.

FIG. 4 is a schematic block diagram illustrating a memory storage device according to an exemplary embodiment of the invention.

Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. In the present exemplary embodiment, the connection interface unit 402 is compatible with a PCI Express (Peripheral Component Interconnect Express) interface standard, and is also compatible with an NVM express interface standard. Specifically, the NVM express interface standard refers to a protocol for communication between the host system and the memory storage device, which defines register interface, command set and feature set between a controller of the memory storage device and an operating system of the host system and aims to improve a data access speed and a data transmission rate for the PCIe interface-based memory storage device by optimizing the interface standard of the memory storage device. However, in another exemplary embodiment, the connection interface unit 402 may also be compatible with other suitable standards. In addition, the connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations, such as writing, reading or erasing data in the rewritable non-volatile memory module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the rewritable non-volatile memory module 406, one or more bits are stored by changing a voltage (a.k.a. a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". Each of the memory cells in the rewritable non-volatile memory module 406 has a plurality of storage states depended on changes in the threshold voltage. The storage state to which the memory cell belongs may be determined by applying a read voltage to the memory cell, so as to obtain the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store two or more bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In the present exemplary embodiment, the physical programming unit is the minimum unit for programming. That is, the physical programming unit is the minimum unit for writing data. For example, the physical programming unit is a physical page or a physical sector. If the physical programming units are the physical page, these physical programming units usually include a data bit area and a redundancy bit area. The data bit area includes multiple physical sectors configured to store user data, and the redundant bit area is configured to store system data (e.g., management data such as error correcting code, etc.). In the present exemplary embodiment, the data bit area includes 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
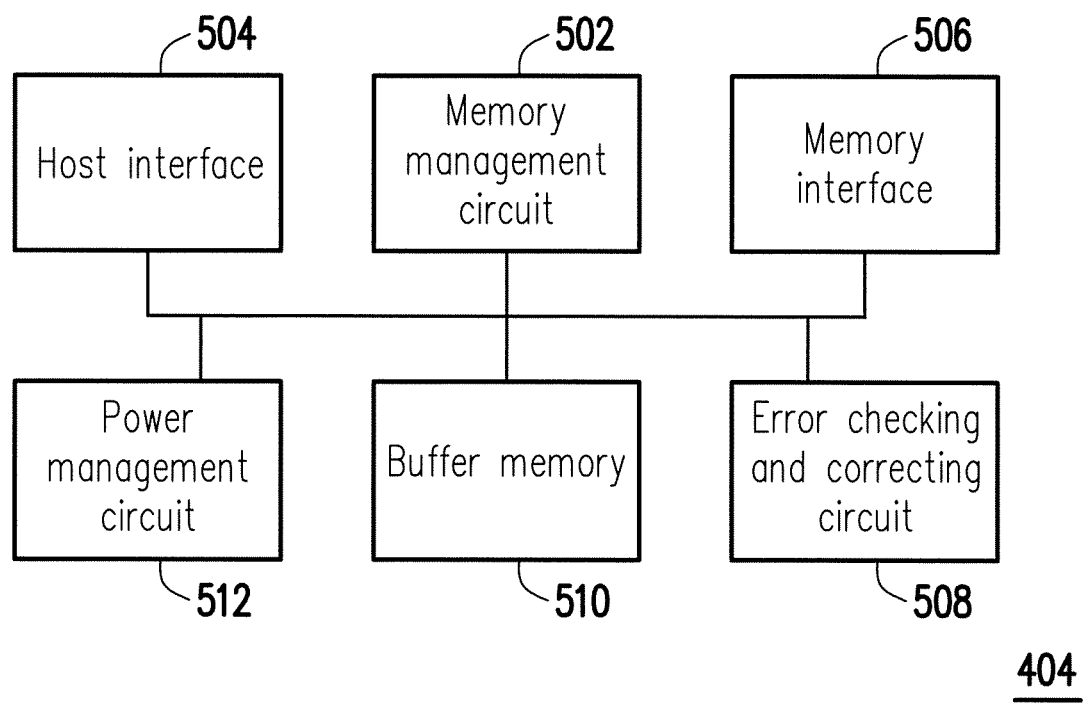
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands and the control commands are executed to perform various operations such as writing, reading and erasing data during operation of the memory storage device 10. Hereinafter, operation of the memory management circuit 502 is described as equivalent to describe operation of the memory control circuit unit 404.

In the present exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. If the memory storage device 10 operates, the control commands are executed by the microprocessor to perform operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 502 if the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to give a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 via the host interface 504. In the present exemplary embodiment, the host interface 504 is compatible with the SATA standard. Nevertheless, it should be understood that the invention is not limited thereto. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence which instructs to write data, the read command sequence which instructs to read data, the erase command sequence which instructs to erase data, and other corresponding command sequences for instructing to perform various memory operations (e.g., changing read voltage levels or performing a garbage collection procedure). These command sequences are generated by the memory management circuit 502 and transmitted to the rewritable non-volatile memory module 406 through the memory interface 506, for example. The command sequences may include one or more signals, or data transmitted in the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure the correctness of data. Specifically, if the memory management circuit 502 receives the write command from the host system 11, the error checking and correcting circuit 508 generates an ECC (error correcting code) and/or an EDC (error detecting code) for data corresponding to the write command, and the memory management circuit 502 writes data corresponding to the write command and the corresponding ECC and/or the EDC into the rewritable non-volatile memory module 406. Then, if the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

It is noted that in the following description, some terms may be replaced with corresponding abbreviations for ease of reading (see Table 1).

TABLE 1

| logical-physical mapping table | L-P Table |
|---|---|
| logical-to-physical mapping table | L2P table |
| physical-to-logical mapping table | P2L table |
| rewritable non-volatile memory module | RNVM module |
| physical unit | PU |
| physical erasing unit | PEU |
| physical programming unit | PPU |
| logical unit | LU |
| logical erasing unit | LEU |
| logical programming unit | LPU |
| memory management circuit | MMC |
| memory control circuit unit | MCCU |
| error checking and correcting circuit | ECCC |
| access command sequence | ACS |

Figure 6:
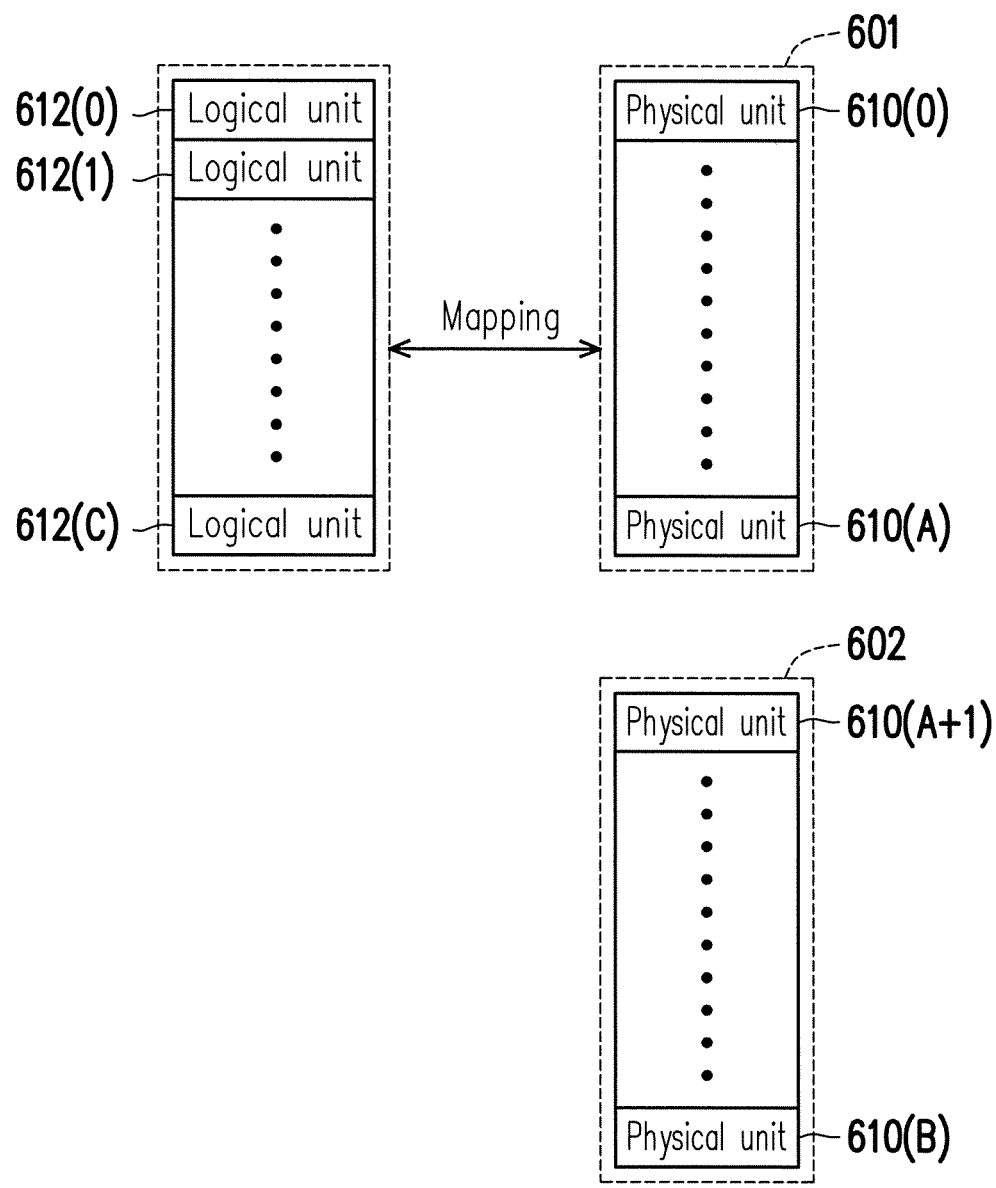
FIG. 6 is a schematic diagram illustrating management of a rewritable non-volatile memory module according to an exemplary embodiment of the invention.

FIG. 6 is a schematic diagram illustrating management of a rewritable non-volatile memory module according to an exemplary embodiment of the invention. It should be noted that terms used for describing management of the RNVM module 406, such as "select" and "group" and so forth, are logical operational concepts. That is to say, only a part of physical elements of the RNVM module 406 is logically operated while the actual location of each physical element of the RNVM module 406 remains unchanged.

Referring to FIG. 6, the MMC 502 logically groups PUs 610(0) to 610(B) of the RNVM module 406 into a storage area 601 and a replacement area 602. The PUs 610(0) to 610(A) in the storage area 601 are configured to store data, and the PUs 610(A+1) to 610(B) in the replacement area 602 are configured to replace damaged PUs in the storage area 601. For example, if data read from one specific PU includes too many errors and thus cannot be corrected, the specific PU is treated as a damaged PU. It should be noted that, if there are no available PEUs in the storage area 602, the MMC 502 may pronounce that the memory storage device 10 is in a write protect state so data can no longer be written thereto.

In the present exemplary embodiment, each PU refers to one PEU. However, in another exemplary embodiment, one PU may also refer to one physical address, one PPU, or a composition of a plurality of continuous or discontinuous physical addresses. The MMC 502 assigns LUs 612 (0) to 612(C) for mapping to the PUs 610(0) to 610(A) in the storage area 601. In the present exemplary embodiment, each LU refers to one physical address. However, in another exemplary embodiment, each LU may also refer to one LPU, one LEU or a composition of a plurality of continuous or discontinuous logical addresses. In addition, each of the LUs 612(0) to 612(C) may also be mapped to one or more PUs.

The MMC 502 records a mapping relation (a.k.a. a logical-physical address mapping relation) between the LUs and the PUs into at least one L-P Table. If the host system 11 intends to read the data from the memory storage device 10 or write the data into the memory storage device 10, the MMC 502 can perform an accessing operation on the memory storage device 10 according to the L-P Table.

Figure 7:
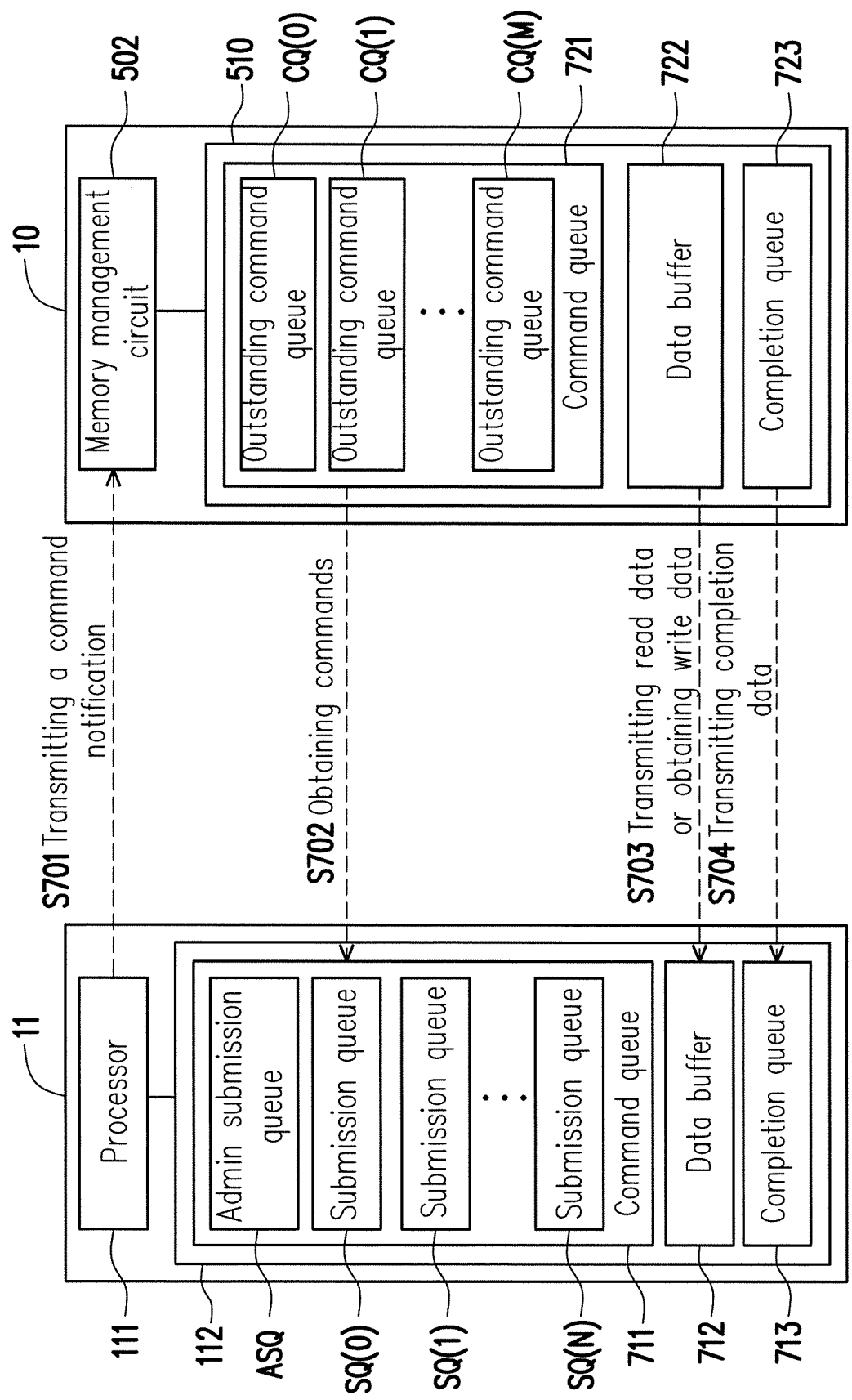
FIG. 7 is a schematic diagram illustrating a data transmitting operation according to an exemplary embodiment of the invention.

FIG. 7 is a schematic diagram illustrating a data transmitting operation according to an exemplary embodiment of the invention. In the present exemplary embodiment, the memory storage device 10 is compatible with the NVM express interface standard. Thus, in comparison with the storage device adopting the SATA (Serial Advanced Technology Attachment) standard, a communication mechanism between the memory storage device 10 and the host system 11 is slightly different. A data transmission mechanism between the memory storage device 10 and the host system 11 according to the exemplary embodiment of the invention is described below with reference to FIG. 7.

Referring to FIG. 7, if the host system 11 intends to perform the accessing operation (e.g., reading data from the memory storage device 10 or writing data into the memory storage device 10) on the memory storage device 10, the processor 111 of the host system 11 puts prepared commands into one command queue 711. Specifically, the command queue 711 is recorded with one admin submission queue ASQ and a plurality of submission queues SQ(0) to SQ(N). Among them, the admin submission queue ASQ is configured to store an admin command, and the submission queue is configured to store an I/O command. The admin command is used to configure and manage the host system and control the memory storage device, and the I/O command is used in data transmission between the host system and the memory storage device. Accordingly, the processor 111 of the host system 11 puts the prepared commands (e.g., write commands or read commands) into at least one submission queue in the command queue 711. It should be noted that, the commands stored by each submission queue can correspond to operations performed by different users, or different types of operations performed by the same user. For instance, different submission queues can be used to store commands (e.g., an access command) generated or given if different applications are executed.

As mentioned above, at least one submission queue in the command queue 711 is stored with the commands. Thus, the processor 111 can transmit one command notification to the memory storage device 10 (step S701). In other words, the command notification is used to indicate that at least one submission queue in the submission queues is stored with at least one command. It should be noted that, in the NVM express interface standard, after the command notification is sent by the host system 11, active behavior of the host system 11 for the memory storage device 10 will end.

Next, the MMC 502 receives such command notification and actively reads and obtains one or more commands in at least one submission queue corresponding to the command notification from the command queue 711 (step S702). Also, the MMC 502 caches the obtained commands into one command queue 721 according to a reading precedence of the commands. For example, the command queue 721 includes a plurality of outstanding command queues CQ(0) to CQ(M), and the obtained commands are sequentially cached into at least one of the outstanding command queues.

Then, the MMC 502 performs a corresponding data accessing operation on the RNVM module 406 according to the commands in the outstanding command queues CQ(0) to CQ(M). For instance, based on one read command, the MMC 502 can perform one data read operation on the RNVM module 406 and transmit the read data obtained from a data buffer 722 to the host system 11 (step S703). For example, the read data is stored into a data buffer 712 of the host system 11. Alternatively, based one write command, the MMC 502 can actively read the write data from the data buffer 712 of the host system 11 and cache the same into the data buffer 722 (step S703). Subsequently, the MMC 502 can perform one data write operation on the RNVM module 406 so as to write the write data cached in the data buffer 722 into the RNVM module 406.

The MMC 502 can generate one completion message in correspondence to completion of one access operation, and the completion message is cached into one completion queue 723. The completion message is used to inform the host system 11 that one access operation corresponding to one command is completed. At a specific time point, completion data containing the completion message are sequentially transmitted to the host system 11 and cached into one completion queue 713 of the host system 11 (step S704). According to the data in the completion queue 723, the host system 11 can obtain information of the memory storage device 10 such as an access data quantity and a data access speed corresponding to one or more access commands.

In the exemplary embodiment of FIG. 7, the command queue 711 is recorded with, for example, 65536 submission queues SQ(0) to SQ(N), whereas the command queue 721 includes, for example, 256 outstanding command queues CQ(0) to CQ(M), but the invention is not limited to the above. For example, in another exemplary embodiment, a volume of the command queue 711 can be configured depending on a memory capacity of the host system 11, and the number of the submission queues can be greater than or less than 65536; a volume of the command queue 721 can be adjusted according to a storage space configuration requirement and an execution performance of the memory storage device 10, and the number of the outstanding command queues can be greater than or less than 256. In addition, the command queue 711, the data buffer 712 and the completion queue 713 are located in the RAM 112 of the host system 11, and the command queue 721, the data buffer 722 and the completion queue 723 are located in the buffer memory 510 of the memory storage device 10. Nonetheless, in another exemplary embodiment, any one of the command queue 711, the data buffer 712 and the completion queue 713 may also be located in other storage media of the host system 11, and any one of the command queue 721, the data buffer 722 and the completion queue 723 may also be located in other storage media (e.g., in the RNVM module 406) of the memory storage device 10.

Figure 8A:
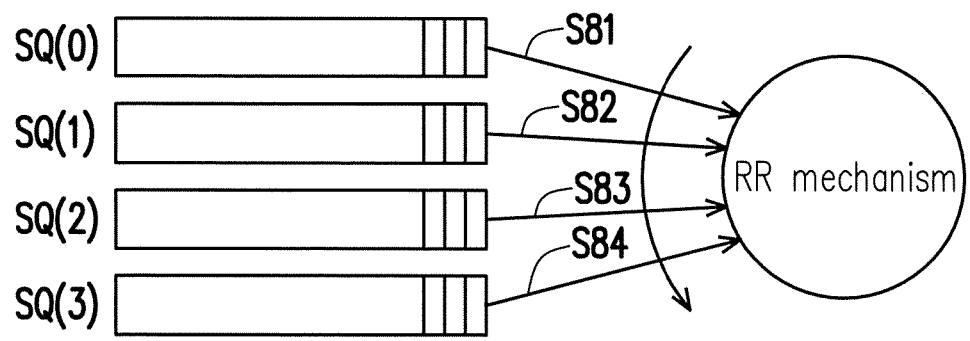
FIG. 8A is a schematic diagram illustrating a command acquisition mechanism defined by the NVM express interface standard according to an exemplary embodiment of the invention.
Figure 8B:
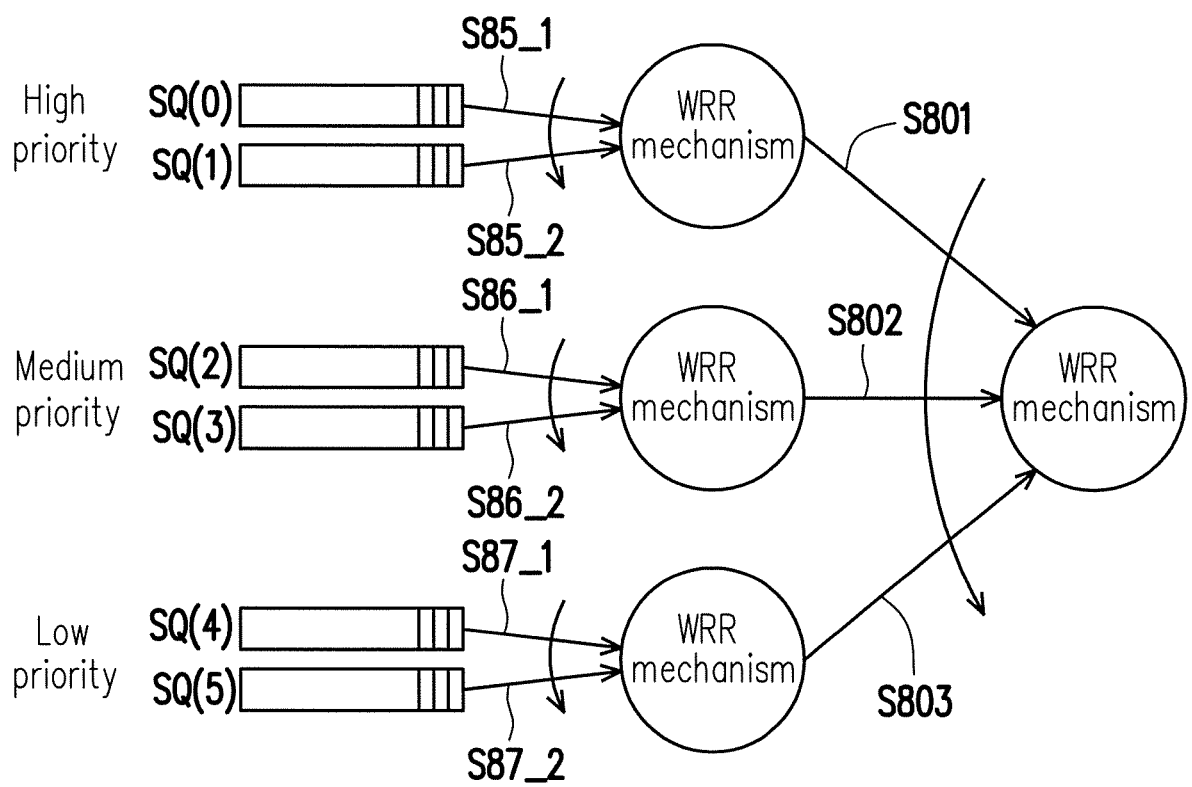
FIG. 8B is a schematic diagram illustrating another command acquisition mechanism defined by the NVM express interface standard according to an exemplary embodiment of the invention.

FIG. 8A is a schematic diagram illustrating a command acquisition mechanism defined by the NVM express interface standard according to an exemplary embodiment of the invention. FIG. 8B is a schematic diagram illustrating another command acquisition mechanism defined by the NVM express interface standard according to an exemplary embodiment of the invention.

Specifically, the NVM express interface standard defines two command acquisition mechanisms in the specification, which are RR (Round Robin) mechanism and WRR (Weighted Round Robin) mechanism. With reference to FIG. 8A, FIG. 8A illustrates a schematic diagram for obtaining commands from the host system 11 with RR mechanism. For descriptive convenience, 4 submission queues SQ(0) to SQ(3) are used herein as an example to explain the operation of the memory storage device 10 for obtaining commands with RR mechanism. However, persons skilled in the art should understand that one command queue 711 can include even more submission queues, and details regarding the same are not repeated hereinafter. It should be noted that, the admin submission queue ASQ is not included in the following discussion because the admin command recorded by the admin submission queue ASQ is used to configure and manage the host system and control the memory storage device, and thus commands can be inserted and immediately processed at any time through the admin submission queue ASQ.

More specifically, if the submission queues SQ(0) to SQ(3) recorded by the host system 11 are all stored with commands, the MMC 502 of the memory storage device 10 can sequentially read a specific number of commands from the submission queues SQ(0) to SQ(3) after receiving the command notification of the host system 11. For example, the MMC 502 sequentially reads 10 commands from the submission queues SQ(0) to SQ(3) in command acquisition operations S81 to S84 into the command queue 721. Particularly, in RR mechanism, the MMC 502 can repeatedly perform the command acquisition operations S81 to S84 according to a read number being set.

On the other hand, FIG. 8B illustrates a schematic diagram for obtaining commands from the host system 11 with WRR mechanism. Specifically, WRR mechanism is a command acquisition operation based on RR mechanism. The difference is that, in WRR mechanism, the submission queues SQ(0) to SQ(N) can be divided to include different priorities, and the submission queues having the different priorities can be set to correspond to different read numbers (i.e., weights). That is to say, the MMC 502 can read a different number of commands separately for each of the submission queues with different priorities. With reference to FIG. 8, for descriptive convenience, 6 submission queues SQ(0) to SQ(5) are used herein as an example to explain the operation of the memory storage device 10 for obtaining commands with WRR mechanism.

For instance, the submission queue SQ(0) and the submission queue SQ(1) have a high priority, the submission queue SQ(2) and the submission queue SQ(3) have a medium priority, and the submission queue SQ(4) and the submission queue SQ(5) have a low priority. Also, the read numbers corresponding to the high priority, the medium priority and the low priority are set to be, for example, 10, 8 and 6, respectively. Accordingly, the MMC 502 sequentially reads 10 commands from each of the submission queues SQ(0) and SQ(1) in the command acquisition operations S85_1 and S85_2, sequentially reads 8 commands from each of the submission queues SQ(2) and SQ(3) in the command acquisition operations S86_1 and S86_2, and sequentially reads 6 commands from each of the submission queues SQ(4) and SQ(5) in the command acquisition operations S87_1 and S87_2. Among them, the command acquisition operations S85_1 and S85_2, the command acquisition operations S86_1 and S86_2 and the command acquisition operations S87_1 and S87_2 respectively corresponding to the submission queues with the different priorities are repeatedly performed by the MMC 502. Then, 20 commands from the submission queues SQ(0) and SQ(1), 16 commands from the submission queues SQ(2) and SQ(3) and 12 commands from the submission queues SQ(4) and SQ(5) as read by the MMC 502 are sequentially cached into the command queue 721 in command acquisition operations S801 to S803. Similarly, the MMC 502 can repeatedly perform the command acquisition operations S801 to S803.

In view of the above, it can be known that both RR mechanism and WRR mechanism are used to restrict the number of commands retrieved each time from the submission queue by the MMC 502. However, with those command acquisition mechanisms being used, if a large number of commands corresponding to the operation performed by the user is recorded in one submission queue SQ(0) (as shown in FIG. 7) while the other submission queue SQ(1) to the submission queue SQ(N) are not yet stored with commands, because the MMC 502 continuously reads commands in the large number of commands in the submission queue SQ(0) from the submission queue SQ(0) into the command queue 721, the space of the command queue 721 will soon be completely consumed by the commands in the submission queue SQ(0). In this case, if the host system 11 receives another operation from the user and commands corresponding to said another operation are recorded in the submission queue SQ(1), the command queue 721 will not have enough space for storing commands in the submission queue SQ(1) such that the commands in the submission queue SQ(1) can be executed only after all the large number of commands temporarily stored in the command queue 721 are processed. Alternatively, in another case, if a large number of commands corresponding to the operation performed by the user is recorded in one submission queue SQ(0) and each of the commands has a large data quantity; if only a small number of commands with a very small data quantity is recorded in the submission queue SQ(1), after a specific number of commands is read from the submission queue SQ(0) into the submission queue 721 by the MMC 502, the space of the submission queue 721 may then be completely occupied by the specific number of commands. In other words, the command queue 721 may not have enough storage space before the MMC 502 can read the commands in the submission queue SQ(1).

In view of the above, in either of the aforementioned cases, the commands in the submission queue SQ(1) can be executed only after all the large number of commands temporarily stored in the command queue 721 are processed. That is to say, even if said another operation of the user only requires accessing a small amount of data, the user still needs to wait a long period of time for the system to respond. Thus, the existing data transmission mechanism is unable to provide on an immediate performance for executing commands corresponding to different operations. Therefore, in the present exemplary embodiment of the invention, a monitor circuit corresponding to each of the submission queues is disposed in the MMC 502 so as to read the command with a specific data quantity from each submission queue.

Figure 9:
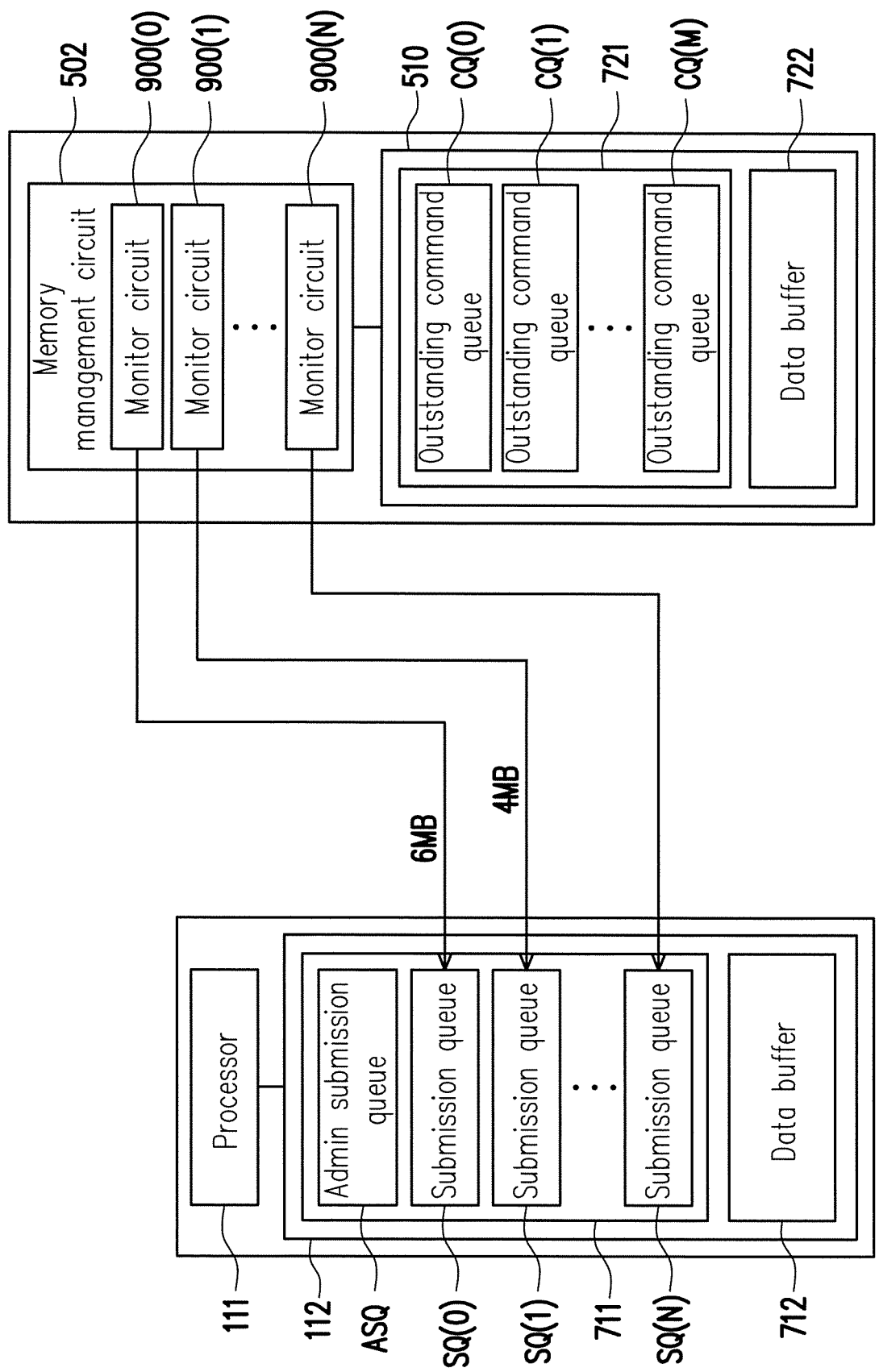
FIG. 9 is a schematic diagram illustrating a command acquisition mechanism and a data transmission mechanism according to an exemplary embodiment of the invention.

FIG. 9 is a schematic diagram illustrating a command acquisition mechanism and a data transmission according to an exemplary embodiment of the invention.

With reference to FIG. 9, the MMC 502 is disposed with a monitor circuit 900(0) to a monitor circuit 900(N). The monitor circuit 900(0) to the monitor circuit 900(N) correspond to the submission queue SQ(0) to the submission queue SQ(N), respectively. Each of the monitor circuits is recorded with a data quantity to be obtained (a.k.a. a predetermined data quantity), and the predetermined data quantities of the monitor circuits may be different from one another. In particular, the MMC 502 uses the predetermined data quantity as a condition for obtaining data (a.k.a. a predetermined condition). For example, the MMC 502 can obtain the commands with the specific data quantity from the corresponding one of the submission queue SQ(0) to SQ(N) according to each of the predetermined data quantities recorded by the monitor circuit 900(0) to the monitor circuit 900(N). More specifically, the commands matching the predetermined condition may include the data quantity that reaches the predetermined data quantity, exceeds the predetermined data quantity or does not reach the predetermined data quantity. Further, in an exemplary embodiment, the MMC 502 can give the best effort to have a difference between the data quantity of the total obtained commands and predetermined data quantity maintained within a tolerable range (a.k.a. a data quantity threshold). Accordingly, each of the commands respectively corresponding to the submission queue SQ(0) to the submission queue SQ(N) read by the MMC 502 through the monitor circuit 900(0) to the monitor circuit 900(N) has the specific data quantity rather than the specific number.

For instance, the predetermined data quantity (a.k.a. a first predetermined data quantity) recorded by the monitor circuit 900(0) (a.k.a. a first monitor circuit 900(0)) is 6 MB (megabyte), and the predetermined data quantity (a.k.a. a second predetermined data quantity) recorded by the monitor circuit 900(1) (a.k.a. a second monitor circuit 900(1)) is 4 MB. If the submission queue SQ (0) (a.k.a. a first submission queue SQ(0)) and the submission queue SQ(1) (a.k.a. a second submission queue SQ(1)) respectively corresponding to the first monitor circuit 900(0) and the second monitor circuit 900(1) are stored with required commands corresponding to the different applications executed by the user, the MMC 502 first reads commands (a.k.a. at least one first command) with the data quantity matching a predetermined condition (a.k.a. a first predetermined condition) from the submission queue SQ(0) according to the command notification from the host system 11, and then reads commands (a.k.a. at least one second command) with the data quantity matching a predetermined condition (a.k.a. a second predetermined condition) from the submission queue SQ(1). Here, the first predetermined condition corresponds to the first predetermined data quantity (i.e., 6 MB) and the second predetermined condition corresponds to the second predetermined data quantity (i.e., 4 MB). Also, the MMC 502 repeatedly performs the operations of reading the at least one first command with the data quantity matching the first predetermined condition from the submission queue SQ(0) into the command queue 721 and reading the at least one second command with the data quantity matching the second predetermined condition from the submission queue SQ(1) into the command queue 721 until the submission queue SQ(0) and the submission queue SQ(1) are no longer stored with commands or are temporarily not stored with commands.

The MMC 502 caches the at least one first command with the data quantity matching the first predetermined condition read from the submission queue SQ(0) and the at least one second command with the data quantity matching the second predetermined condition read from the submission queue SQ(1) into the command queue 721. More specifically, in the case where a volume of each of the outstanding command queues CQ(0) to CQ(M) is 1 MB in the command queue 721, the MMC 502 first caches the at least one first command with a specific data quantity (e.g., approximately 6 MB) into the outstanding command queues CQ(0) to CQ(5), and then caches the at least one second command with a specific data quantity (e.g., approximately 4 MB) into the command queue 712 That is, the at least one second command with the specific data quantity (e.g., approximately 4 MB) is cached into the outstanding command queues CQ(6) to CQ(9), where the at least one second command is subsequent to the at least one first command in the command queue 712.

Accordingly, in the case where a large number of commands corresponding to the operation performed by the user is recorded in the first submission queue SQ(0) and each of the commands has a large data quantity (e.g., a total data quantity of the large number of commands is greater than 256 MB) while only a small number of commands with a very small data quantity is recorded in the submission queue SQ(1) (e.g., a total data quantity of the small number of commands is less than 4 MB), the MMC 502 first caches the at least one first command with the specific data quantity (e.g., approximately 6 MB) into the outstanding command queues CQ(0) to CQ(5), and then subsequently caches the at least one second command with the very small data quantity (e.g., less than 4 MB) into the outstanding command queues CQ(6) to CQ(9). Therefore, once the at least one first command in the outstanding command queues CQ(0) to CQ(5) is completely processed by the MMC 502, the at least one second command with the very small data quantity remained in the submission queue SQ(1) can then be executed immediately. Alternatively, if a large number of commands corresponding to the operation performed by the user is recorded in the first submission queue SQ(0) while the other submission queue SQ(1) to the submission queue SQ(N) are not yet stored with commands, the MMC 502 can check whether commands are being written into the other submission queue SQ(1) to the submission queue SQ(N) each time if the at least one first command with the specific data quantity (e.g., approximately 6 MB) is completely read. Therefore, in case the host system 11 suddenly receives another operation of the user, the commands corresponding to said another operation may also be read immediately by the MMC 502 after being recorded into one of the submission queue SQ(1) to the submission queue SQ(N).

In this way, with use of the command acquisition mechanism according to the exemplary embodiments of the invention, even if the large number of commands must be executed for a specific operation, the commands corresponding to the other operations can still be immediately executed. As a result, the user can experience the immediate performance for the different operations being executed or run. In other words, according to the exemplary embodiments of the invention, a long delay time that the other operations have to wait before execution due to many resources of the memory storage device 10 occupied by one specific operation may be solved.

Figure 10:
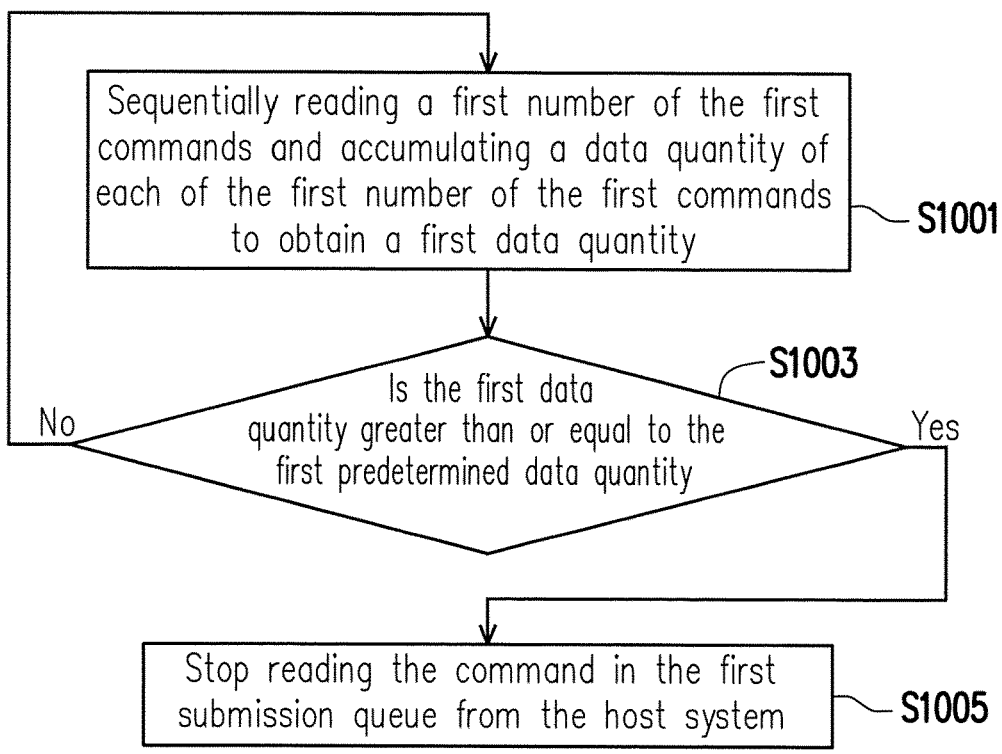
FIG. 10 illustrates a flowchart for obtaining commands matching a predetermined condition from one submission queue according to an exemplary embodiment of the invention.

FIG. 10 illustrates a flowchart for obtaining commands matching a predetermined condition from one submission queue according to an exemplary embodiment of the invention.

The method of determining whether the data quantity of the commands obtained from one submission queue matches the predetermined condition in the invention is described below with reference to FIG. 10. Here, the description is provided using the example of obtaining the at least one first command matching the first predetermined condition in the first submission queue SQ(0) from the host system 11 and the example of obtaining the at least one second command matching the second predetermined condition in the second submission queue SQ(1) from the host system 11. Here, the first predetermined condition is matched if a total data quantity of the at least one first command is greater than or equal to the first predetermined data quantity (e.g., 6 MB), for example; the second predetermined condition is matched if a total data quantity of the at least one second command is greater than or equal to the second predetermined data quantity (e.g., 4 MB), for example. Referring to FIG. 10, in step S1001, the MMC 502 sequentially reads a number (a.k.a. a first number) of the first commands and accumulates a data quantity of each of the first number of the first commands to obtain a total data quantity (a.k.a. a first data quantity). Next, in step S1003, the MMC 502 determines whether the first data quantity is greater than or equal to the first predetermined data quantity so as to decide whether to continue reading the commands in the first submission queue (step S1001) or stop reading the command in the first submission queue from the host system 11 (step S1005).

For instance, the first number is 4, and the first predetermined data quantity is 6 MB. In step S1001, the MMC 502 first reads 4 commands from the first submission queue SQ(0) and decodes the 4 commands to calculate a total data quantity thereof. At the time, if the total data quantity of the 4 commands is 7 MB, the MMC 502 then treats 7 MB as the first data quantity and determines that the first data quantity is greater than the first predetermined data quantity (i.e., 6 MB). Therefore, in step S1005, the MMC 502 stops reading the command in the first submission queue SQ(0) from the host system 11. In other words, once the accumulated first data quantity (i.e., 7 MB) exceeds the first predetermined data quantity (i.e., 6 MB), the MMC 502 can determine that the currently obtained first command with the first data quantity (i.e., 7 MB) matches the first predetermined condition and stop reading the command in the first submission queue SQ(0) from the host system 11. Then, the MMC 502 obtains the at least one second command matching the second predetermined condition in the second submission queue SQ(1) from the host system 11.

The operation of obtaining the at least one second command matching the second predetermined condition in the second submission queue SQ(1) from the host system 11 is identical or similar to the operation of obtaining the at least one first command matching the first predetermined condition in the first submission queue SQ(0) from the host system 11, and can also adopt the steps in FIG. 10. The difference is that, the predetermined data quantities recorded by the first monitor circuit 900(0) and the second monitor circuit 900(1) may be different. Similarly, the MMC 502 first reads 4 commands from the second submission queue SQ(1) and decodes the 4 commands to calculate a total data quantity thereof. At the time, if the total data quantity of the 4 commands is 4 MB, the MMC 502 then treats 4 MB as the second data quantity and determines that the second data quantity is equal to (i.e., not greater than) the second predetermined data quantity (i.e., 4 MB). In other words, the second data quantity at the time (i.e., 4 MB) just reaches the second predetermined data quantity (i.e., 4 MB). Therefore, the MMC 502 determines that the second command with the second data quantity matches the second predetermined condition and stops reading the command in the second submission queue SQ(1) from the host system 11.

In the foregoing exemplary embodiments of the invention, once the accumulated data quantity reaches or exceeds the predetermined data quantity, obtaining the command by the MMC 502 in the current submission queue from the host system 11 is stopped and the command in the next submission queue is obtained instead. In this way, if a large amount of data is stored in the current submission queue, execution of the commands in the other submission queues will not be delayed. However, the invention is not limited thereto. For example, in another exemplary embodiment, the MMC 502 stops reading the command in the current submission queue from the host system 11 before the accumulated data quantity reaches the predetermined data quantity.

Figure 11:
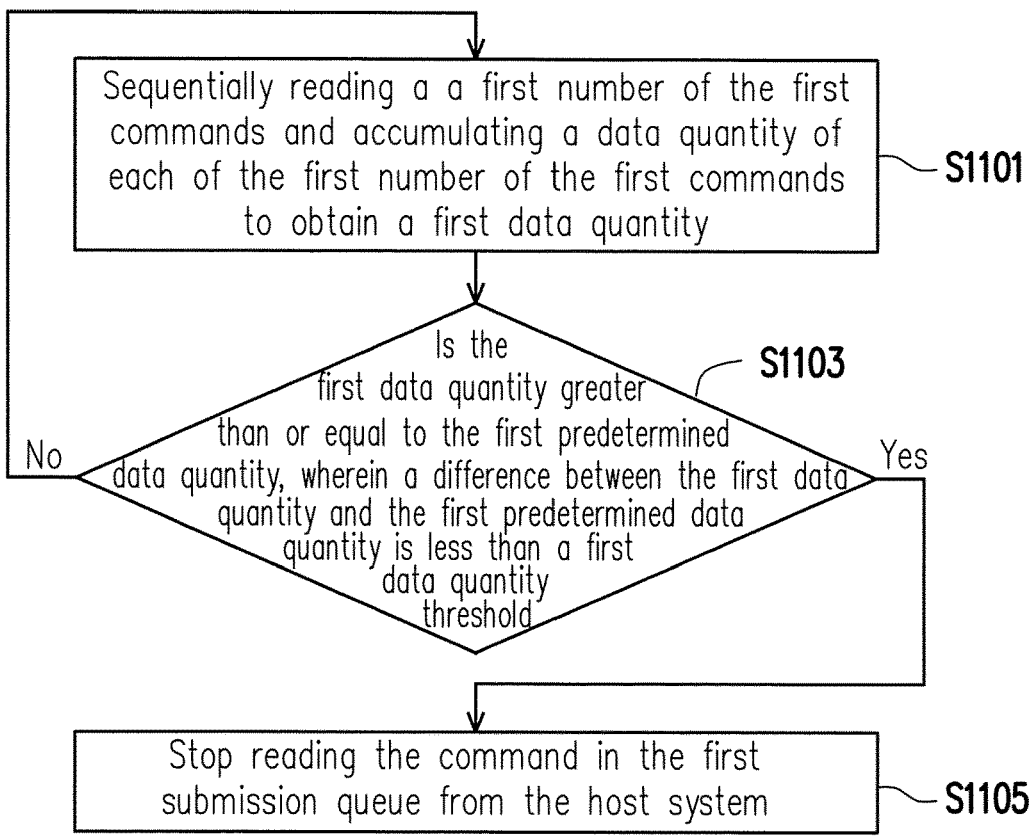
FIG. 11 illustrates a flowchart for obtaining commands matching a predetermined condition from one submission queue according to another exemplary embodiment of the invention.

FIG. 11 illustrates a flowchart for obtaining commands matching a predetermined condition from one submission queue according to another exemplary embodiment of the invention.

With reference to FIG. 11, the description is provided also using the example of obtaining the at least one first command matching the first predetermined condition in the first submission queue SQ(0) from the host system 11 and the example of obtaining the at least one second command matching the second predetermined condition in the second submission queue SQ(1) from the host system 11. For instance, the first number is 4, the first predetermined data quantity is 6 MB and a first data quantity threshold is 1 MB. In step S1101, the MMC 502 first reads 4 commands from the first submission queue SQ(0) and decodes the 4 commands to calculate a total data quantity thereof. At the time, if the total data quantity of the 4 commands is 2.5 MB, the MMC 502 then treats 2.5 MB as the first data quantity and determines that the first data quantity is not greater than the first predetermined data quantity in step S1103. However, a difference (i.e., 3.5 MB) between the first data quantity and the first predetermined data quantity is not less than the first data quantity threshold (i.e., 1 MB). Therefore, the MMC 502 performs step S1101 again to read the next first number of the first command. For example, if the total data quantity of the next 4 commands read by the MMC 502 from the first submission queue SQ(0) is 3 MB, the MMC 502 accumulates the two total data quantities of the commands to obtain the first data quantity. At the time, the first data quantity is 5.5 MB. Therefore, in step S1103, the MMC 502 determines that the current first data quantity is not greater than the first predetermined data quantity and the current difference (i.e., 0.5 MB) between the first data quantity and the first predetermined data quantity is less than the first data quantity threshold (i.e., 1 MB), and then performs step S1105 to stop reading the command in the first submission queue SQ(0) from the host system 11. In other words, if the accumulated first data quantity (i.e., 5.5 MB) does not reach the first predetermined data quantity (i.e., 6 MB) and yet the difference between the first data quantity and the first predetermined data quantity is less than the first data quantity threshold, the MMC 502 determines that the total data quantity accumulated after reading the next 4 commands again from the first submission queue SQ(0) may exceed the first predetermined data quantity (i.e., 6 MB), so as to further determine that the obtained first command with the first data quantity (i.e., 5.5 MB) matches the first predetermined condition.

Similarly, after determining that the first data quantity of the obtained at least one first command matches the first predetermined condition, the MMC 502 continues to obtain the at least one second command matching the second predetermined condition in the second submission queue SQ(1) from the host system 11. The operation of obtaining the at least one second command matching the second predetermined condition in the second submission queue SQ(1) from the host system 11 is identical or similar to the operation of obtaining the at least one first command matching the first predetermined condition in the first submission queue SQ(0) from the host system 11, and can also adopt the steps in FIG. 11. The difference is that, the predetermined data quantities recorded by the first monitor circuit 900(0) and the second monitor circuit 900(1) are different. Therefore, the data quantity threshold of each of the first monitor circuit 900(0) and the second monitor circuit 900(1) serving as a determination condition may also be set to be a different value. For example, in the operation of obtaining the at least one second command matching the second predetermined condition in the second submission queue SQ(1) from the host system 11, a second predetermined threshold is set to be 0.5 MB. However, the invention is not limited thereto. For example, in another exemplary embodiment, the second data quantity threshold may also be set to be a value identical to the first data quantity threshold.

For instance, it is assumed that the second submission queue SQ(1) is only recorded with a small number of commands with a very small data quantity. For example, a total data quantity of the small number of commands is 3 MB. In this case, the MMC 502 reads all the commands (a.k.a. the at least one second command) in the second submission queue SQ(1) and treats this 3 MB of data as the second data quantity. In particular, after all the commands in the second submission queue SQ(1) are read by the MMC 502, it turns out that the second data quantity (i.e., 3 MB) is not greater than the second predetermined data quantity (i.e., 4 MB). Therefore, the MMC 502 will not consider whether a difference between the second data quantity (i.e., 3 MB) and the second predetermined data quantity (i.e., 4 MB) is less than the second data quantity threshold (i.e., 0.5 MB). Instead, the MMC 502 determines that the second command with the second data quantity matches the second predetermined condition and directly stops reading the command in the second submission queue SQ(1) from the host system 11. In this way, the operation corresponding to the commands in the second submission queue SQ(1) can be immediately executed and completed so the user can experience the immediate execution of multiple operations being executed or run.

It should be noted that, aforementioned values of the first predetermined data quantity, the second predetermined data quantity, the first data quantity threshold, the second data quantity threshold, the first number and the second number are merely example values instead of limitations to the invention. Besides, the first command and the second command are, for example, write commands or read commands. Specifically, according to the exemplary embodiments of the invention, in the operation of obtaining the at least one first command matching the first predetermined condition in the first submission queue SQ(0) from the host system 11, the MMC 502 merely uses the data quantity of the write commands or the read commands in the first submission queue SQ(0) to determine whether the command matches the first predetermined condition; or, in the operation of obtaining the at least one second command matching the second predetermined condition in the second submission queue SQ(1) from the host system 11, the MMC 502 merely uses the data quantity of the write commands or the read commands in the second submission queue SQ(1) to determine whether the command matches the second predetermined condition. However, the invention is not limited thereto. For example, in another exemplary embodiment, the first command may include commands other than the write command or the read commands, and the second command may include commands other than the write command or the read commands.

It should be noted that, the invention is not intended to limit the predetermined data quantity corresponding to each submission queue. For example, in the exemplary embodiments of the invention, the commands stored by each submission queue can correspond to operations performed by different users, or different operations performed by the same user. For example, the different submission queues are used to store commands given or generated if different applications are executed. Accordingly, the MMC 502 can set the predetermined data quantities recorded by the monitor circuit 900(0) to the monitor circuit 900(N) according to the type of the commands stored corresponding to each of the submission queues. In other words, the predetermined data quantity corresponding to each submission queue can be dynamically adjusted according to type, property and importance of the stored commands. For example, in the present exemplary embodiment, the second predetermined data quantity corresponding to the second submission queue SQ(1) is different from the first predetermined data quantity corresponding to the first submission queue SQ(0). However, the invention is not limited thereto. In another exemplary embodiment, the monitor circuits corresponding to the different submission queues may also be recorded with the same predetermined data quantity. For example, the second predetermined data quantity corresponding to the second submission queue SQ(1) may be identical to the first predetermined data quantity corresponding to the first submission queue SQ(0).

In addition, the operation of obtaining commands matching the predetermined data quantity from the corresponding one of the submission queue SQ(0) to the submission queue SQ(N) are implemented through hardware circuits (i.e., the monitor circuit 900(0) to the monitor circuit 900(N)). However, in another exemplary embodiment, the operation of obtaining the commands matching the predetermined data quantity from the corresponding one of the submission queue SQ(0) to the submission queue SQ(1) may also be implemented in form of software, which is not particularly limited by the invention.

It is noted that, in the existing WRR mechanism, the submission queues can be divided to include different priorities, that is, the submission queues with different priorities correspond to different weights (i.e., the read number of commands). Nonetheless, the data quantities of the commands may be different from one another. Therefore, different numbers of commands retrieved from the submission queues with different priorities may still have the same total data quantity. For instance, referring back to FIG. 8, the MMC 502 reads 10 commands from the submission queues SQ(0) and SQ(1) with the high priority and reads 8 commands from the submission queues SQ(2) and SQ(3) with the medium priority according to the weights. If the data quantity of each command is 4 MB in the submission queues SQ(0) and SQ(1) and the data quantity of each command is 5 MB in the submission queues SQ(2) and SQ(3), the total data quantity of 20 commands read from the submission queues SQ(0) and SQ(1) read by the MMC 502 is 80 MB, and the total data quantity of 16 commands read from the submission queues SQ(2) and SQ(3) are also 80 MB. That is to say, even though the submission queues with the different priorities have different weights, the total data quantities of the commands read from the submission queues with the different priorities may still be the same. In other words, the existing weight mechanism under WRR mechanism is not objective, and fails to consider the type of the commands stored in the submission queues and the resources of the memory storage device occupied by the total data quantity of the read commands. In contrast, according to the exemplary embodiments of the invention, the MMC 502 can set the predetermined data quantity corresponding to each submission queue according to type, property and importance of commands. Also, each of the read commands respectively corresponding to the submission queue SQ(0) to the submission queue SQ(N) substantially includes a specific data quantity. In this way, according to the exemplary embodiments of the invention, not only can the problem of many resources of the memory storage device 10 occupied by the specific operation be solved to prevent the operations from waiting for a long delay time before being executed, type, property and importance of the commands in each submission queue may also be considered to effectively accomplish the purpose of giving each submission queue the weight.

Figure 12:
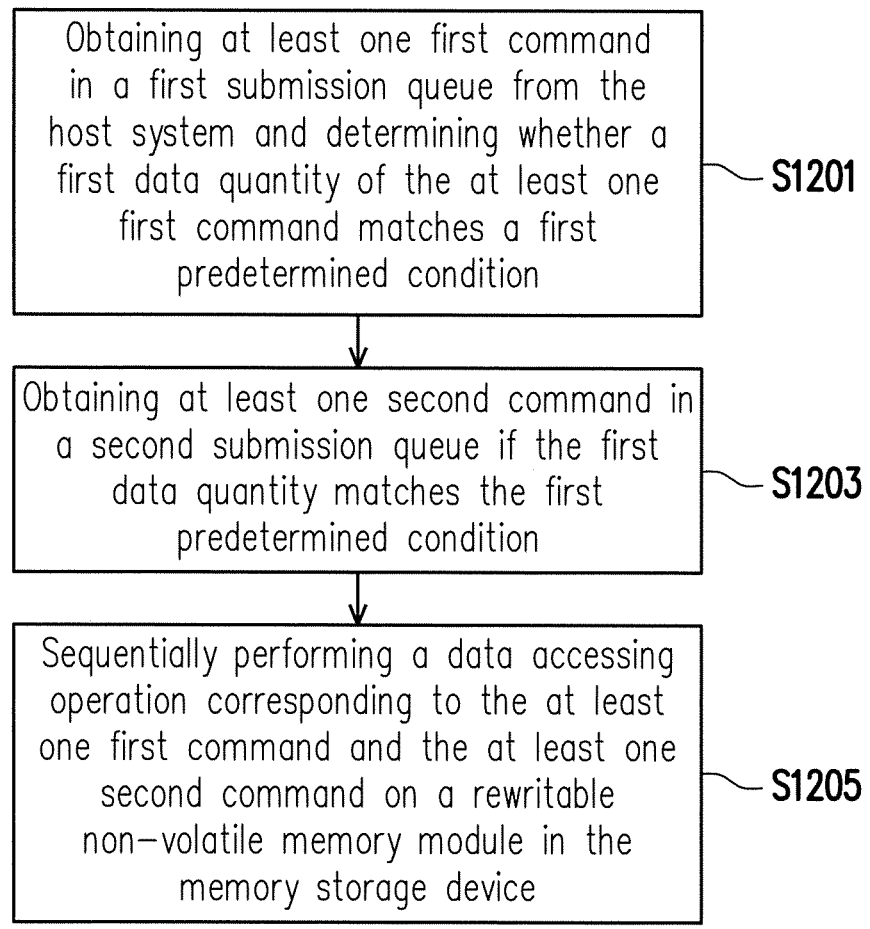
FIG. 12 is a flowchart illustrating a data transmitting method according to an exemplary embodiment of the invention.

FIG. 12 is a flowchart illustrating a data transmitting method according to an exemplary embodiment of the invention.

Referring to FIG. 12, in step S1201, the MMC 502 obtains at least one first command in the first submission queue form the host system 11 and determines whether a first data quantity of the at least one first command matches a first predetermined condition.

In step S1203, at least one second command in a second submission queue is obtained if the first data quantity matches the first predetermined condition.

Next, in step S1205, the MMC 502 sequentially performs a data accessing operation corresponding to the at least one first command and the at least one second command on the RNVM module 406 in the memory storage device 10.

Nevertheless, steps depicted in FIG. 12 are described in detail as above so that related description thereof is omitted hereinafter. It should be noted that, the steps depicted in FIG. 12 may be implemented as a plurality of program codes or circuits, which are not particularly limited in the invention. Moreover, the method disclosed in FIG. 12 may be implemented by reference with above exemplary embodiments, or may be implemented separately, which are not particularly limited in the invention.

In summary, in the data transmitting method, the memory storage device and the MCCU proposed by the exemplary embodiments of the invention, commands with the specific data quantity can be obtained from each submission queue according to the predetermined data quantity corresponding to each submission queue so as to sequentially cache the commands with the specific data quantity in each submission queue into the memory storage device. Accordingly, the resources and the space of the memory storage device will not be occupied by certain operation with the large number of commands, such that the immediate performance corresponding to different operations can be realized. As such, the problem of massive delay time to be waited before execution due to some operations can be solved. On the other hand, with the operation of setting data quantity for each submission queue according to type, property and importance of commands in the invention, the specific data quantity of the commands read from the each submission queue can be effectively controlled, so as to accomplish the purpose of giving each submission queue the weight.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data transmitting method for a data transmitting operation between a memory storage device and a host system, wherein the host system is recorded with a plurality of submission queues that are included in the host system, and the data transmitting method comprises:
obtaining at least one first command in a first submission queue from the host system and determining whether a first data quantity of the at least one first command matches a first predetermined condition;
obtaining at least one second command in a second submission queue from the host system if the first data quantity matches the first predetermined condition; and
sequentially performing a data accessing operation corresponding to the at least one first command and the at least one second command on a rewritable non-volatile memory module in the memory storage device.

2. The data transmitting method according to claim 1, wherein the step of determining whether the first data quantity of the at least one first command matches the first predetermined condition comprises:
sequentially reading a first number of the first commands and accumulating a data quantity of each of the first number of the first commands to obtain the first data quantity; and
determining that the first data quantity matches the first predetermined condition and stopping reading the command in the first submission queue from the host system if the first data quantity is greater than or equal to a first predetermined data quantity.

3. The data transmitting method according to claim 2, wherein the at least one second command in the second submission queue matches a second predetermined condition, and the second predetermined condition is a second data quantity of the at least one second command greater than or equal to a second predetermined data quantity, wherein the second predetermined data quantity is different from the first predetermined data quantity.

4. The data transmitting method according to claim 1, wherein the step of determining whether the first data quantity of the at least one first command matches the first predetermined condition further comprises:
sequentially reading a first number of the first commands and accumulating a data quantity of each of the first number of the first commands to obtain the first data quantity; and
determining that the first data quantity matches the first predetermined condition and stopping reading the command in the first submission queue from the host system if the first data quantity is not greater than a first predetermined data quantity, wherein a difference between the first data quantity and the first predetermined data quantity is less than a first data quantity threshold.

5. The data transmitting method according to claim 4, wherein the at least one second command in the second submission queue matches a second predetermined condition, and the second predetermined condition is a second data quantity of the at least one second command not greater than a second predetermined data quantity, wherein a difference between the second data quantity and the second predetermined data quantity is less than a second data quantity threshold, wherein the second predetermined data quantity is different from the first predetermined data quantity, and the second data quantity threshold is different from the first data quantity threshold.

6. The data transmitting method according to claim 1, wherein the step of obtaining the at least one second command in the second submission queue from the host system if the first data quantity matches the first predetermined condition further comprises:
putting the at least one first command matching the first predetermined condition into a command queue; and
putting the at least one second command after the at least one first command in the command queue.

7. The data transmitting method according to claim 1, wherein the at least one first command comprises a first write command or a first read command, and the at least one second command comprises a second write command or a second read command.

8. The data transmitting method according to claim 1, wherein the step of obtaining the at least one first command in the first submission queue from the host system is in response to a command notification from the host system,
wherein the command notification indicates that at least one submission queue in the submission queues is stored with at least one command.

9. The data transmitting method according to claim 1, wherein the memory storage device is compatible with an NVM express interface standard.

10. A memory storage device, comprising:
a connection interface unit configured to couple to a host system, wherein the host system is recorded with a plurality of submission queues that are included in the host system;
a rewritable non-volatile memory module; and
a memory control circuit unit, coupled to the connection interface unit and the rewritable non-volatile memory module,
wherein the memory control circuit unit is configured to obtain at least one first command in a first submission queue from the host system and determine whether a first data quantity of the at least one first command matches a first predetermined condition,
wherein the memory control circuit unit is further configured to obtain at least one second command in a second submission queue from the host system if the first data quantity matches the first predetermined condition,
wherein the memory control circuit unit is further configured to send a first access command sequence which instructs to sequentially perform a data accessing operation corresponding to the at least one first command and the at least one second command on the rewritable non-volatile memory module.

11. The memory storage device according to claim 10, wherein in the operation of determining whether the first data quantity of the at least one first command matches the first predetermined condition, the memory control circuit unit further configured to sequentially read a first number of the first commands and accumulate a data quantity of each of the first number of the first commands to obtain the first data quantity,
wherein the memory control circuit unit is further configured to determine that the first data quantity matches the first predetermined condition and stop reading the command in the first submission queue from the host system if the first data quantity is greater than or equal to a first predetermined data quantity.

12. The memory storage device according to claim 11, wherein the at least one second command in the second submission queue matches a second predetermined condition, and the second predetermined condition is a second data quantity of the at least one second command greater than or equal to a second predetermined data quantity, wherein the second predetermined data quantity is different from the first predetermined data quantity.

13. The memory storage device according to claim 10, wherein in the operation of determining whether the first data quantity of the at least one first command matches the first predetermined condition, the memory control circuit unit is further configured to sequentially read a first number of the first commands and accumulate a data quantity of each of the first number of the first commands to obtain the first data quantity,
wherein the memory control circuit unit is further configured to determine that the first data quantity matches the first predetermined condition and stop reading the command in the first submission queue from the host system if the first data quantity is not greater than a first predetermined data quantity, wherein a difference between the first data quantity and the first predetermined data quantity is less than a first data quantity threshold.

14. The memory storage device according to claim 13, wherein the at least one second command in the second submission queue matches a second predetermined condition, and the second predetermined condition is a second data quantity of the at least one second command not greater than a second predetermined data quantity, wherein a difference between the second data quantity and the second predetermined data quantity is less than a second data quantity threshold, wherein the second predetermined data quantity is different from the first predetermined data quantity, and the second data quantity threshold is different from the first data quantity threshold.

15. The memory storage device according to claim 10, wherein in the operation of obtaining the at least one second command in the second submission queue from the host system if the first data quantity matches the first predetermined condition, the memory control circuit unit is further configured to put the at least one first command matching the first predetermined condition into a command queue, and put the at least one second command after the at least one first command in the command queue.

16. The memory storage device according to claim 10, wherein the at least one first command comprises a first write command or a first read command, and the at least one second command comprises a second write command or a second read command.

17. The memory storage device according to claim 10, wherein the operation of obtaining the at least one first command in the first submission queue from the host system is in response to a command notification from the host system,
wherein the command notification indicates that at least one submission queue in the submission queues is stored with at least one command.

18. The memory storage device according to claim 10, wherein the memory storage device is compatible with an NVM express interface standard.

19. A memory control circuit unit, configured to control a rewritable non-volatile memory module, the memory control circuit unit comprising:

a host interface, configured to couple to a host system, wherein the host system is recorded with a plurality of submission queues that are included in the host system;
a memory interface, configured to couple to the rewritable non-volatile memory module; and
a memory management circuit, coupled to the host interface and the memory interface, wherein the memory management circuit comprises a plurality of monitor circuits, and each of the monitor circuits corresponds to at least one submission queue of the submission queues,
wherein the memory management circuit is configured to obtain at least one first command in a first submission queue from the host system and determine whether a first data quantity of the at least one first command matches a first predetermined condition,
wherein the memory management circuit is configured to obtain at least one second command in a second submission queue from the host system if the first data quantity snatches the first predetermined condition,
wherein the memory management circuit is further configured to send a first access command sequence which instructs to sequentially perform a data accessing operation corresponding to the at least one first command and the at least one second command on the rewritable non-volatile memory module.

20. The memory control circuit unit according to claim 19, wherein a first monitor circuit of the monitor circuits is configured to record a first predetermined data quantity, and in the operation of determining whether the first data quantity of the at least one first command matches the first predetermined condition, the memory management circuit is further configured to sequentially read a first number of the first commands and accumulate a data quantity of each of the first number of the first commands to obtain the first data quantity,
wherein the memory management circuit is further configured to determine that the first data quantity matches the first predetermined data quantity and stop reading the command in the first submission queue from the host system if the first data quantity is greater than or equal to the first predetermined data quantity.

21. The memory control circuit unit according to claim 20, wherein a second monitor circuit of the monitor circuits is configured to record a second predetermined data quantity, and the at least one second command in the second submission queue matches the second predetermined condition, wherein the second predetermined condition is a second data quantity of the at least one second command greater than or equal to the second predetermined data quantity, and the second predetermined data quantity is different from the first predetermined data quantity.

22. The memory control circuit unit according to claim 19, wherein a first monitor circuit of the monitor circuits is configured to record a first predetermined data quantity, and in the operation of determining whether the first data quantity of the at least one first command matches the first predetermined condition, the memory management circuit is further configured to sequentially read a first number of the first commands and accumulate a data quantity of each of the first number of the first commands to obtain the first data quantity,
wherein the memory management circuit is further configured to determine that the first data quantity matches the first predetermined condition and stop reading the command in the first submission queue from the host system if the first data quantity is not greater than the first predetermined data quantity, wherein a difference between the first data quantity and the first predetermined data quantity is less than a first data quantity threshold.

23. The memory control circuit unit according to claim 22, wherein a second monitor circuit of the monitor circuits is configured to record a second predetermined data quantity, and the at least one second command in the second submission queue matches the second predetermined condition, wherein the second predetermined condition is a second data quantity of the at least one second command not greater than the second predetermined data quantity, and a difference between the second data quantity and the second predetermined data quantity is less than a second data quantity threshold, wherein the second predetermined data quantity is different from the first predetermined data quantity, and the second data quantity threshold is different from the first data quantity threshold.

24. The memory control circuit unit according to claim 19, wherein in the operation of obtaining the at least one second command in the second submission queue from the host system if the first data quantity matches the first predetermined condition, the memory management circuit is further configured to put the at least one first command matching the first predetermined condition into a command queue, and put the at least one second command after the at least one first command in the command queue.

25. The memory control circuit unit according to claim 19, wherein the at least one first command comprises a first write command or a first read command, and the at least one second command comprises a second write command or a second read command.

26. The memory control circuit unit according to claim 19, wherein the operation of obtaining the at least one first command in the first submission queue from the host system is in response to a command notification from the host system, wherein the command notification indicates that at least one submission queue in the submission queues is stored with at least one command.

27. The memory control circuit unit according to claim 19, wherein the memory control circuit unit is compatible with an NVM express interface standard.

* * * * *